United States Patent [19]

Handleman

[11] Patent Number: 5,370,247
[45] Date of Patent: Dec. 6, 1994

[54] FERRIS WHEEL TYPE CONTAINER POSITIONING MECHANISM

[75] Inventor: John C. Handleman, Canton, Mich.
[73] Assignee: Ford Motor Company, Dearborn, Mich.
[21] Appl. No.: 102,366
[22] Filed: Aug. 5, 1993
[51] Int. Cl.⁵ ............................................. A47F 5/00
[52] U.S. Cl. .................................................... 211/164
[58] Field of Search ............... 211/164, 163, 165, 1.52, 211/10, 78, 121, 131

[56] References Cited

U.S. PATENT DOCUMENTS

| | | | |
|---|---|---|---|
| 524,107 | 8/1894 | Fuchs | 211/164 X |
| 1,552,290 | 9/1925 | Fowler | 211/164 |
| 2,792,105 | 5/1957 | Wilson | 198/211 |
| 3,237,759 | 3/1966 | Solski et al. | 198/211 |
| 3,784,024 | 1/1974 | Kristy | 211/131 |
| 4,852,748 | 8/1989 | Burgess et al. | 211/70.6 |
| 5,039,918 | 8/1991 | Lemons | 312/267 |

*Primary Examiner*—Alvin C. Chin-Shue
*Assistant Examiner*—Sarah L. Purol
*Attorney, Agent, or Firm*—Roger L. May; Joseph W. Malleck

[57] ABSTRACT

A ferris wheel type container positioning mechanism having a ferris wheel arrangement carrying three carriages equally spaced thereon. The three carriages are pivotably attached between a pair of rotatably driven wheels and traverse a circular path during a first portion of its total path and traverse a linear path when being displaced adjacent to the floor. Rollers are provided on the bottom of the carriages to facilitate their linear displacements. The container platforms of the carriages may include a turn table and/or a tilt top to provide the best ergonomic positioning of the container for access by the worker.

17 Claims, 5 Drawing Sheets

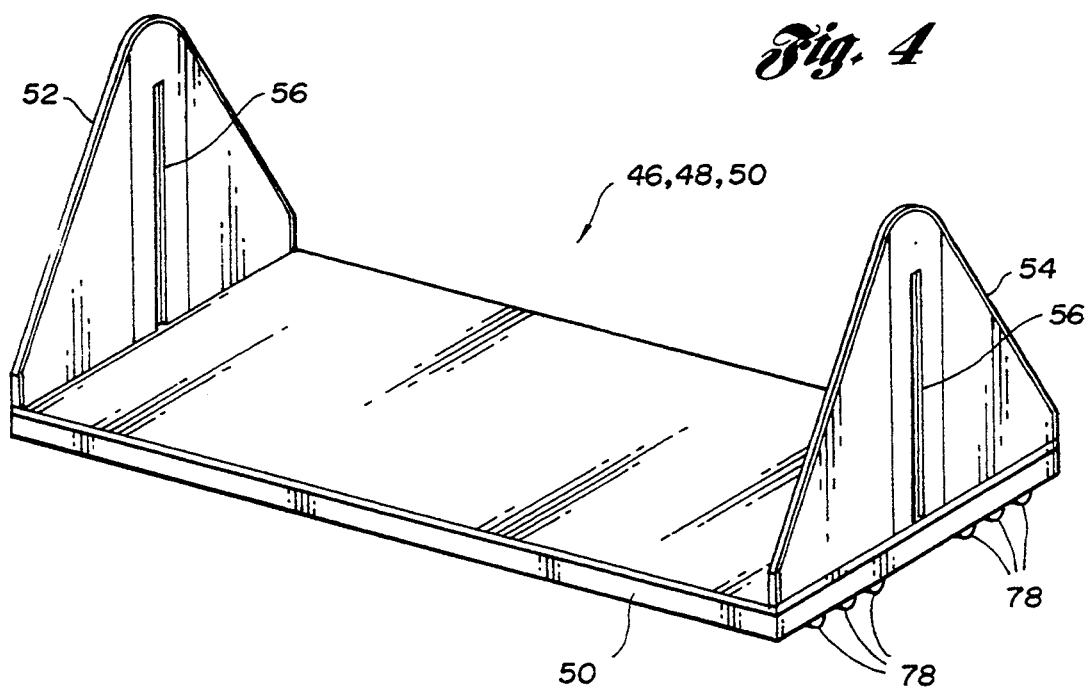
Fig. 4
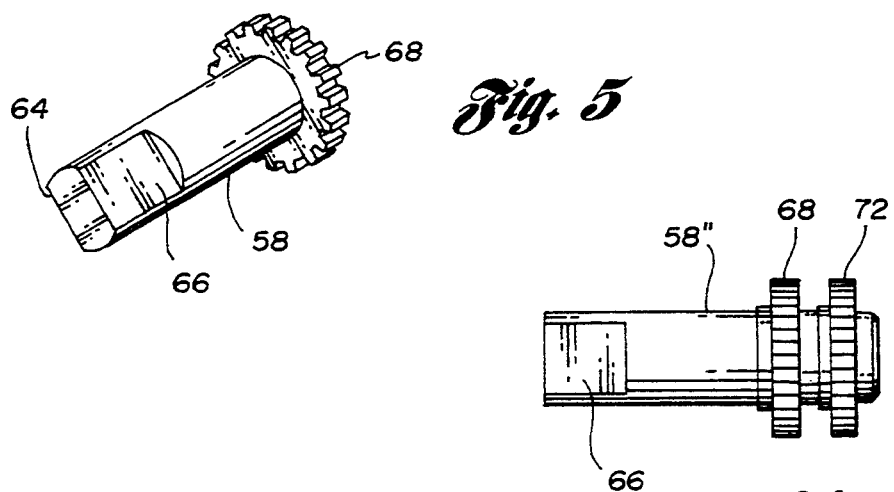
Fig. 5
Fig. 6
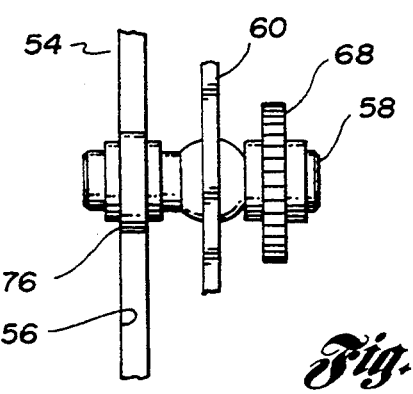
Fig. 7

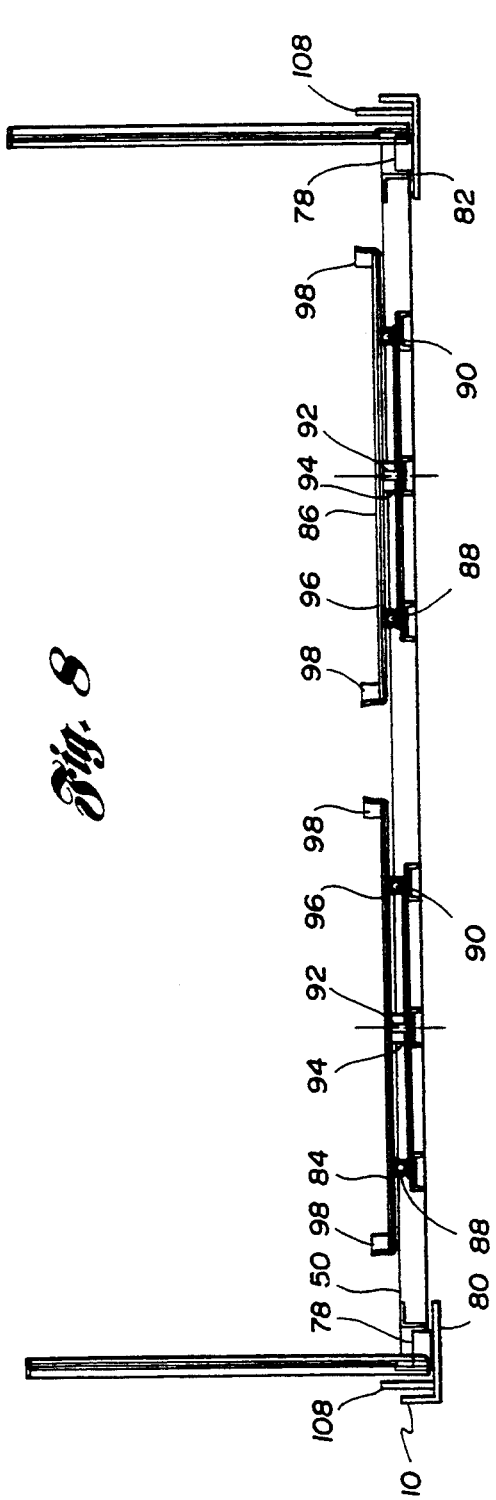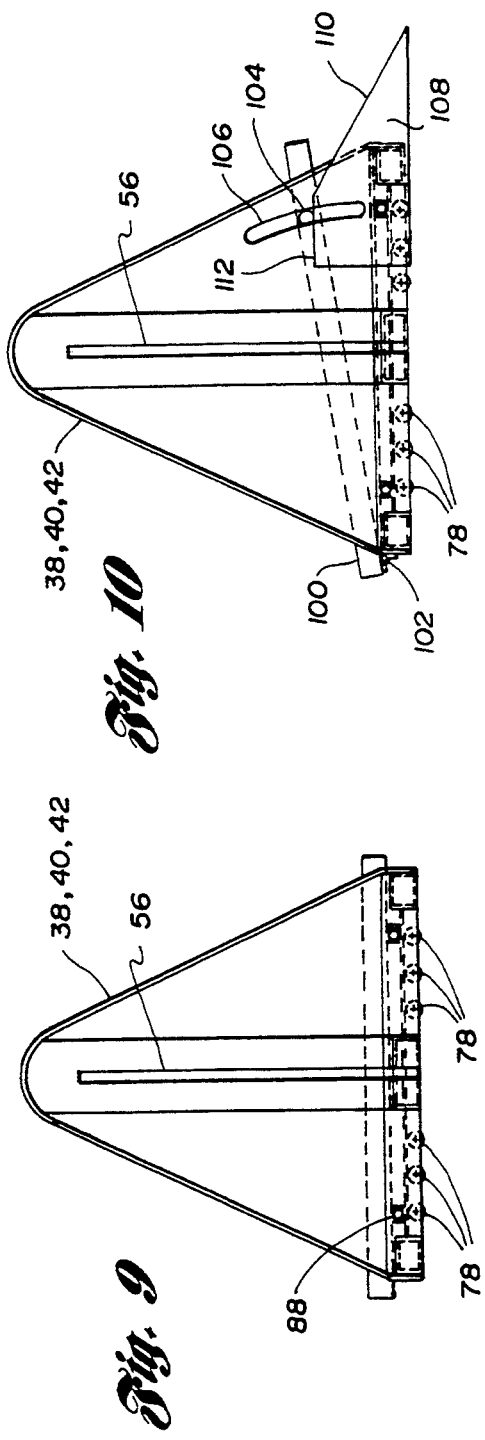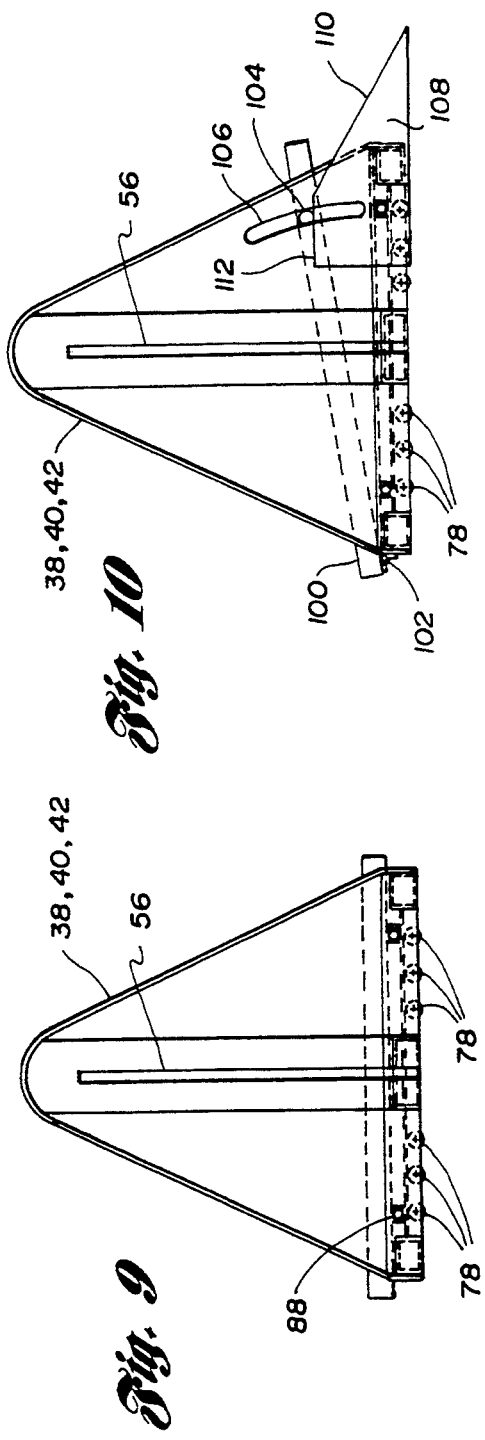

FERRIS WHEEL TYPE CONTAINER POSITIONING MECHANISM

TECHNICAL FIELD

The invention is related to a mechanism for positioning material containers for access by a worker and, in particular, to a ferris wheel type mechanism in which the material containers are displaceable between a worker station and a reloading station such that down time for reloading is minimized.

BACKGROUND ART

The maintenance of a continuous supply of parts or materials at a part fabrication or production line operator station has always been a problem in manufacturing facilities. Normally, the parts or materials are presented to the operator station on a pallet or in pallet mounted containers. When a pallet or container becomes empty, it has to be replaced with a fully loaded pallet or container. This has resulted in excessive time losses while the empty pallet or container is removed and replaced with a full one.

Various types of ferris wheel mechanisms have been developed over the years for providing access to various articles, parts or materials. Wilson, in U.S. Pat. No. 2,792,105, discloses a planetary parking structure for automotive vehicles. The parking structure is in the form of a ferris wheel having a plurality of platforms, each holding a vehicle. A planetary gear system maintains the platforms parallel to ground surface. Solski et al, in U.S. Pat. No. 3,237,759, teaches a pallet transfer device having a ferris wheel type mechanism which transfers a pallet from an upper conveyor to a lower conveyor. Krysty, in U.S. Pat. No. 3,784,024, Burgess et al in U.S. Pat. No. 4,852,748 and Lemons in U.S. Pat. No. 5,039,180, disclose ferris wheel type display and tool holding mechanisms.

Various other types of pallet or container transfer devices are commercially available. Harcon Engineering, Inc. of Madison Heights, Mich. and Steel Master Transfer, Inc. of Orion, Mich. disclose pallet and container transfer mechanisms having a vertical lift at one end which transfers the empty pallet or container from a lower load conveyor to an upper unload conveyor. These commercially available mechanisms include mechanisms of tilting the container to provide easier access to its content and turntables which permit the container to be rotated. Airfloat Corporation of Decatur, Ill. also teaches mechanisms for rotating and tilting a pallet or container.

The invention is a ferris wheel type mechanism for positioning pallets and/or containers in which two or more pallets and/or containers may be positioned at the operator station and which is easy to load full containers and remove or unload empty containers.

SUMMARY OF THE INVENTION

A ferris wheel type positioning mechanism having a substantially horizontal base, a pair of spatially separated upstanding frame members and a shaft rotatably supported therebetween. A pair of spatially separated wheels are attached to the shaft and are rotatable therewith. Three container carriages are disposed between the spatially separated wheels at equal angular intervals. Each of the carriages have a substantially horizontal container platform. Pivot shafts disposed at opposite ends of the carriages pivotably connect the carriages to the wheels. Means are provided by rotating the wheels and for maintaining the platforms in a substantially horizontal plane. Means are also provided for linearly displacing the carriages parallel to the horizontal base during predetermined rotational intervals of the wheels.

In the preferred embodiment, each carriage has a set of wheels provided at its opposite ends which engage the base during the predetermined rotational interval allowing the carriage to roll along the base during the predetermined rotational interval of the wheels.

One advantage of the positioning mechanism is that the carriage containing the material being used and an empty container may simultaneously be placed at a floor level permitting the removal of an empty container and the replacement thereof at the floor level by a fork lift truck without interfering with a worker's use of the full container.

Another advantage is that because of the linear portion of the carrier's path, the overall height of the positioning mechanism is substantially reduced.

Still another advantage is that the container platform may include one or more turn tables.

Yet another advantage is that the carrier platform may include a tilt top permitting the container to be positioned at an optimum ergonomic angle for the worker.

Still another advantage of the ferris wheel arrangement is that a worker may have access to parts or components in six or more containers.

These and other advantages of the ferris wheel type container positioning mechanism will become more apparent from a reading of the specification in conjunction with the drawings.

BRIEF DESCRIPTION OF THE DRAWINGS

FIG. 4 is a perspective view of a carriage;

FIG. 5 is a perspective view of the pivot shaft;

FIG. 6 is a side view of the pivot shaft 58";

FIG. 7 is a side view of an alternate embodiment of the pivot shaft;

FIG. 8 is a front view of a carriage having a turn table;

FIG. 9 is a side view of the carriage shown in FIG. 8; and

FIG. 10 is a side view of a carriage having a tilt top.

DETAILED DESCRIPTION OF THE INVENTION

Figure 1:
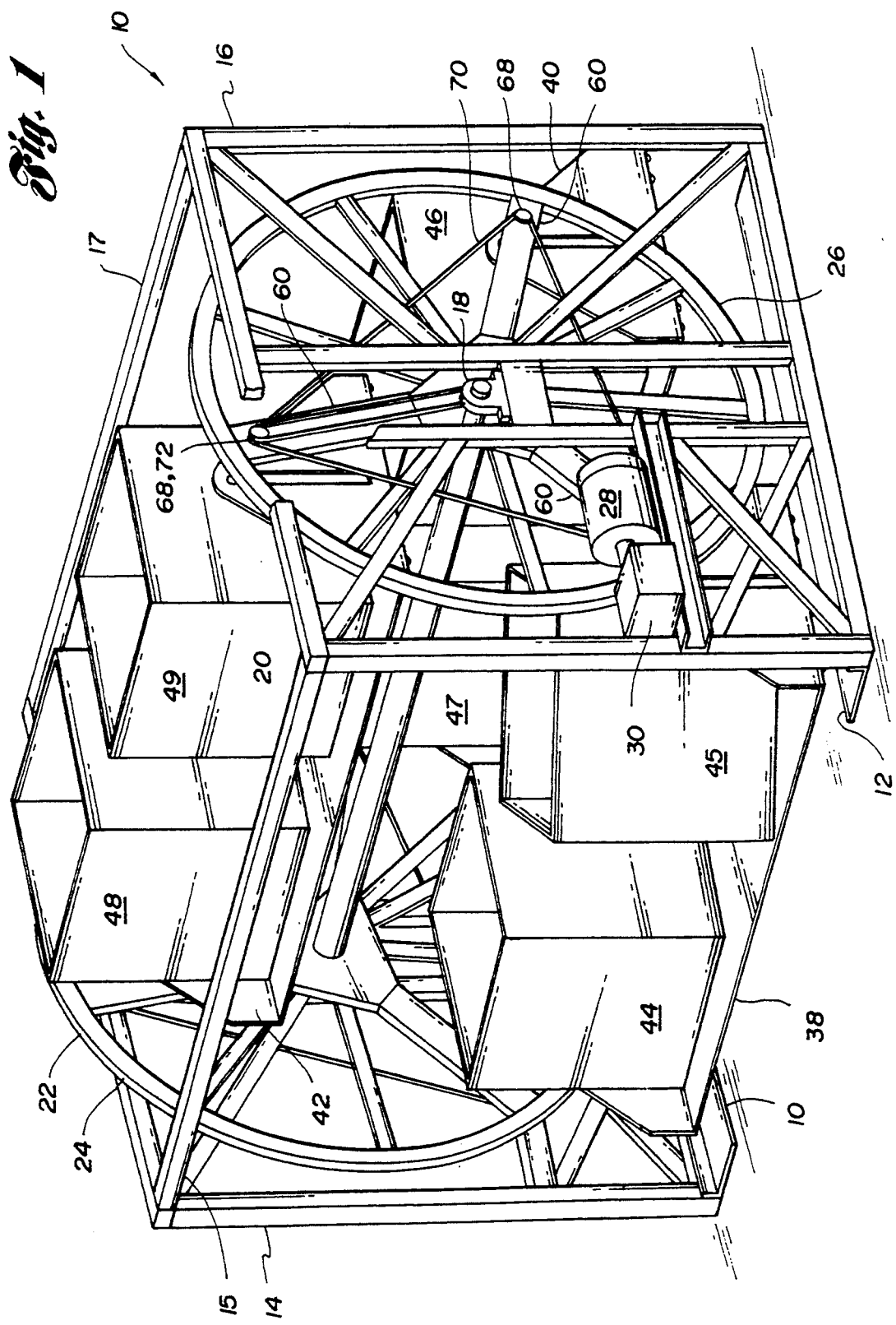
FIG. 1 is a perspective view of the ferris wheel container positioning mechanism.
Figure 2:
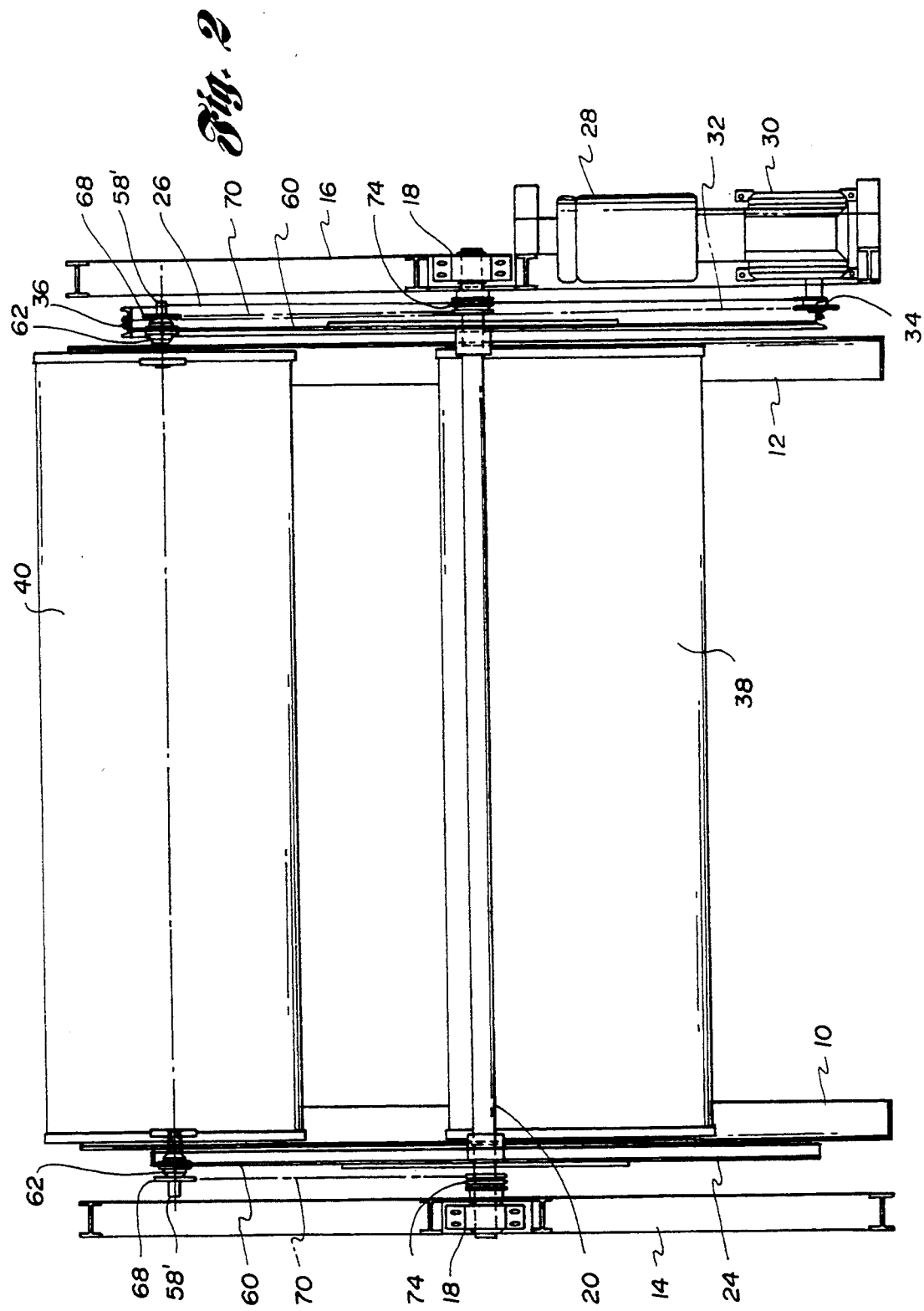
FIG. 2 is a sectional top view taken along the section lines 2—2 of FIG. 3.

FIG. 1 shows a perspective view of the container handling mechanism of this invention. The container handling mechanism has a pair of L-shaped base members 10 and 12 which are mountable to the floor. Two spatially separated upright support members 14 and 16 are attached to the base members 10 and 12. The support members 14 and 16 may be joined at their upper ends by cross beams 15 and 17. Each of the support members has a journal 18 rotatably supporting the ends of a shaft 20 of a ferris wheel assembly 22. The ferris wheel assembly 22 has a pair of wheels 24 and 26 attached to the shaft 20 adjacent to the upright support members 14 and 16, respectively. Wheel 26 is rotated by a motor 28 through a gear box 30 and a chain drive linkage 32, which is entrained about the periphery of the wheel 26. As shown in FIG. 2, the gear box 30 has a chain drive linkage 32 shown symbolically by a dot-dash line. The drive chain linkage 32 engages a set of teeth 36 provided about the periphery of end wheel 26. Since both end wheels 24 and 26 are attached to the shaft 20, the rotation of wheel 26 is accompanied by a corresponding rotation of wheel 24.

Three carriages 38, 40 and 42 having containers 44 through 49 placed thereon are pivotably attached at their opposite ends to the wheels 24 and 26. Each of the three carriages 38, 40 and 42 has a container platform 50 and two upstanding end members 52 and 54 provided on the opposite ends thereof as shown in FIG. 4. The end members 52 and 54 each have a vertical guide slot 56 through which is received a pivot shaft 58. Each pivot shaft 58 is rotatably attached to a radial spoke 60 of the wheels 24 and 26 by means of a bushing 62. The pivot shafts 58 are equally spaced from each other and the pivot shafts rotatably connected to wheel 24 are in axial alignment with a corresponding pivot shaft 58 on wheel 26. As shown in FIG. 5, the end of each of the pivot shafts 58 which is received in the slots 56 have opposing flat surfaces 64 and 66 which slidably engage the sides of the slot 56 to inhibit a pivoting of the carriages 38, 40 and 42 relative to the pivot shaft 58.

Each pivot shaft 58 has a gear 68 provided on the end opposite the flat surfaces 64 and 66 which is engaged by a drive chain 70.

Figure 3:
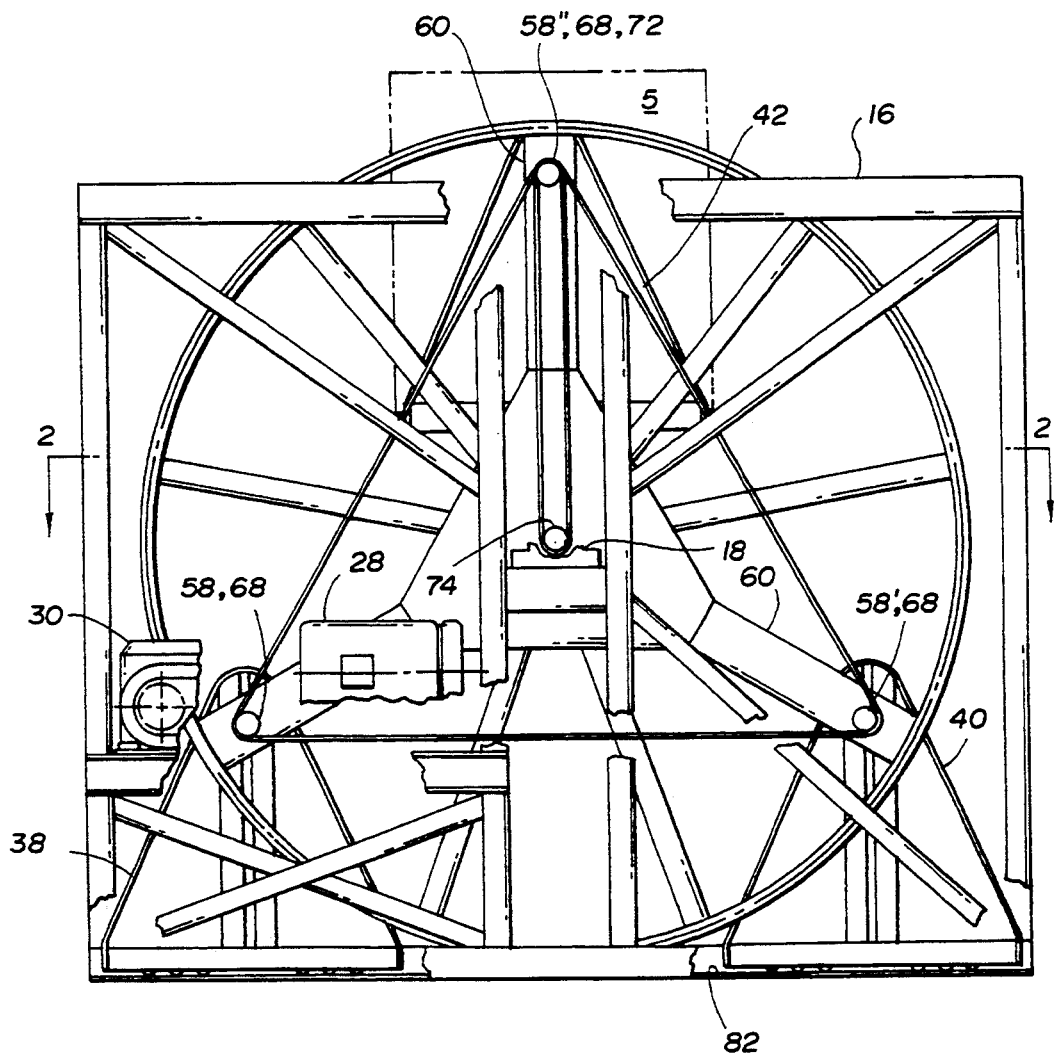
FIG. 3 is a partial cross-sectional view of the positioning mechanism.

As shall be explained relative to FIG. 3, one of the pivot shafts 58, designated as pivot shaft 58'', further includes an idler gear 72 as shown in FIG. 6. The idler gear 72 freely rotates with respect to pivot shaft 58''.

Referring now to FIGS. 2 and 3, the drive chain 70 is entrained about a stationary gear 74 fixedly attached to the upright support member 16 concentric with the shaft 20. The drive chain 70 is then entrained around the gear 68 attached to pivot shaft 58 (FIG. 3) over the gear 68 attached to pivot shaft 58 then over the idler gear 72 of pivot shaft 58'' back to stationary gear 74. This gear and drive chain arrangement maintains the opposing flat surfaces 66 and 68 of the pivot shafts 58, 58' and 58'' oriented in a substantial vertical plane which, in turn, maintains the container platform 50 of the carriages 38, 40 and 42 oriented in a horizontal plane as the wheels 24 and 26 are rotated.

The arrangement of the pivot shafts 58, 58' and 58'', the drive chain 70, gears 68, idler gear 72, and stationary gear 64 are replicated on the opposite or left side of the carrier handling device as viewed in FIGS. 1 and 2.

In an alternate embodiment shown in FIG. 7, an elongated guide 76 may be fixedly attached to the end of the pivot shaft 58. The elongated guide 76 is received in the slot 56, in place of the flat surfaces 64 and 66. The elongated guides 76 provide greater leverage on the sides of the slots 56 which increases the force urging the carriers 38, 40 and 42 to remain oriented with their container platforms 50 in a substantially horizontal plane. This prevents the carriages from tipping when the load on the platforms are unbalanced relative to pivot shafts 58, 58' and 58''. Further details of the carriages shall be discussed relative to FIGS. 8, 9 and 10.

As shown in FIGS. 8 and 9, the carriages 38, 40 and 42 have a plurality of rollers 78, rotatably attached to the container platforms 50 along the opposite ends thereof. As shown in FIGS. 3 and 8, the rollers 78 extend slightly below the lower surfaces of the platforms 50 and engage the horizontal portions 80 and 82 of the L-shaped base members 10 and 12 when the carriages are in a lowered position. As shown in FIG. 3, the height of the shaft 20 above the upper surfaces of the horizontal portions 80 and 82 of the base members 10 and 12 is selected so that as the wheels 24 and 26 are rotated in either direction, the roller 78 of each container carriage 38, 40 and 42 will engage the upper surfaces of the horizontal portions 80 and 82 of the base members 10 and 12 near their ends. As the wheels 24 and 26 continue to rotate, the carriages 38, 40 and 42 will roll on rollers 78 in a horizontal plane along the horizontal portions 80 and 82 of the base members 10 and 12 until they reach the opposite ends thereof. The slots 56 provided in the end members 52 and 54 of the carriages 38, 40 and 42 permit the container carriages 38, 40 and 42 to roll along the surface of the base members 10 and 12 as the wheels 24 and 26 rotate. The height of the shaft 20 is preferably selected so that at predetermined rotational positions of the wheels 24 and 26, the rollers 78 of two of the three carriages 38, 40 and 42 are engaged with the base members 10 and 12 as shown in FIG. 3. This arrangement permits empty containers to be removed from or new containers loaded onto one of the carriages, for example, carriage 40, while a worker or operator continues to use the parts or other articles contained in the other container on carriage 38 (FIG. 3). In the preferred embodiment, two containers can be loaded onto each of the carriages giving the operator or worker a choice of at least six different sets of parts if so desired. However, the carriages may carry only a single container or more than two. Because the carriage opposite the one currently being used by the worker is at the floor or ground level, the container may be removed or replaced by a conventional fork lift truck.

Returning to FIGS. 8 and 9, the container platforms 50 may include one or more turn tables, such as turn tables 84 and 86 on which the containers may be placed. The turn tables 84 and 86 are mounted on a horizontal ball race 88 having a plurality of balls 90 confined in a ball cage. The balls rotatably support the turn table 84 or 86 on the base 50. The turn tables 84 and 86 also have a shaft 92 concentric with the axis of rotation of the all race of the turn table. The shaft 92 is received in a bearing 94 fixedly attached to the container platform 50. The shaft 92 holds the turn table on the platform and helps to relieve the horizontal ball race 88 of any horizontal forces which may inadvertently be applied to the turn tables.

The upper surface 96 of the turn tables 84 may be either square or circular and may include one or more lips, such as lips 98, to prevent the containers from inadvertently being misplaced on the turn tables or from falling off of the carriages as they are being moved.

The carriages 38, 40 and 42 may alternatively have a tiltable top surface 100 which is hinged to the container platform 50 along a leading edge thereof by a hinge 102. The top 100 has a horizontally disposed pin 104 protruding from each of its opposite sides 52 and 54 through arcuate slots 106. A ramp 108 is attached to a stationary member of the structure, such as the L-shaped base members 10 and 12 as shown in FIG. 8 or the upright support member 14 and 16. The pins 104 engage the slopped edge 110 of the ramp 108 as the container carriage 38, 40 and 42 is displaced forward by the rotation of wheels 24 and 26. The engagement of the horizontal pins 104 with the ramps 108 will raise the rear end of top 100, as shown, tilting the container thereon at an angle toward the worker. The height of the ramp 108 is preferably selected for the best ergonomic angle for the worker.

The length of the horizontal portion 112 of the ramp is preferably selected so that as the wheels 24 and 26 continue to rotate, the pivot shaft will engage the upper ends of the slot 56 and begin to lift the entire carriage. As the carriage is lifted, the top 100 will return to its normal horizontal position without bumping or jarring. The height of the ramp 108 may be fixed as shown, or may be adjustable.

Having disclosed a preferred embodiment of the container handling mechanism, it is recognized that others skilled in the art may make changes or improvements thereto within the scope of the appended claims.

I claim:

1. A container handling mechanism comprising:
a support structure having a base and two spatially separated upright frame members;
a ferris wheel assembly disposed between said spatially separated upright members and rotatably supported therefrom, said ferris wheel assembly having a plurality of pivotably suspended carriages displaceable about a circular path with the rotation of each of said plurality of carriages by said ferris wheel assembly through a first rotational interval relative to said base and each of said plurality of carriages displaceable along a linear path adjacent to and parallel to said base with the rotation of said ferris wheel through a second rotational interval relative to said base, each carriage of said plurality of carriages having a substantially horizontal platform for holding at least one container thereon; and
means for rotating said ferris wheel assembly.

2. The mechanism of claim 1 wherein said ferris wheel assembly further comprises:
a shaft disposed between said upright frame members and rotatably supported thereby;
a pair of spatially separated wheels attached to said shaft, each wheel of said pair of wheels being adjacent to a respective one of said two upright frame members;
a plurality of pivot shafts attached to each wheel of said spatially separated wheel, said plurality of pivot shafts pivotably attaching said plurality of carriages to said spatially separated wheels.

3. The mechanism of claim 2 wherein each carriage of said plurality of carriages has an upstanding end member attached to each end of said platform, and wherein each end member has a vertically oriented slot receiving a respective one of said plurality of pivot shafts to pivotably support said carriages.

4. The mechanism of claim 3 wherein each of said pivot shafts has a pair of parallel flat surfaces provided at its end received in said vertically oriented slot; and
means responsive to the rotation of spatially separated wheels to maintain said parallel flat surfaces vertically oriented.

5. The mechanism of claim 3 wherein each of said pivot shafts has a linear guide provided at its end which is received in said vertically oriented slot; and
means responsive to the rotation of said spatially separated wheels to maintain said linear guides vertically oriented.

6. The mechanism of claim 1 wherein each of said platforms of said plurality of carriages have a set of rollers provided along each edge thereof, said rollers extending a short distance below said platform and rollingly engaging said base.

7. The mechanism of claim 6 wherein said base comprises a spatially separated pair of L-shaped members having a vertical portion attached to said upright frame members and a horizontal portion, said horizontal portions extending toward each other and being engageable by said rollers when said carriage is rotated through said second interval by said ferris wheel.

8. The mechanism of claim 1 wherein said platform of at least one of said plurality of carriages has at least one turn table provided thereon.

9. The mechanism of claim 1 wherein said platform of at least one of said plurality of carriages has two turn tables.

10. The mechanism of claim 1 wherein said platform of at least one of said plurality of carriages has a tilt top; and
means for tilting said tilt top in response to displacing said carriage along said base during said second rotational interval of said ferris wheel assembly relative to said base.

11. A ferris wheel type container positioning mechanism, comprising:
a support structure having a horizontal base and two spatially separated upright frame members;
a shaft disposed between said frame members and rotatably attached thereto;
a pair of spatially separated wheels attached to said shaft and rotatably therewith, each of said wheels being disposed adjacent to a respective one of said frame members;
means for rotating said wheels;
three carriages disposed between said wheels at equal angular intervals, each of said carriages having a container platform;
pivot shafts connecting each of said carriages to each of said wheels;
means for maintaining said container platform of each of said carriages in a substantial horizontal plane;
means for linearly displacing each of said carriages parallel to said horizontal base during a predetermined rotational interval of said wheels.

12. The container positioning mechanism of claim 11 wherein each carriage has an end member disposed at opposite ends of said platform and a set of rollers provided along each of said opposite ends, each end member having a vertical slot receiving therein a respective one of said pivot shafts and wherein said set of rollers engage said horizontal base during said predetermined rotational interval, and said pivot shafts are displaced along said vertical slots as said wheel rotates through said predetermined rotational interval.

13. The container positioning mechanism of claim 12 wherein the location of said longitudinal shaft above said base is selected such that said set of rollers of two of said three carriages simultaneously are engaged with said base.

14. The container positioning mechanism of claim 13 wherein said base comprises two L-shaped base members, each of said L-shaped base members having a vertical portion attached to a respective one of said spatially separated upright frame members and a horizontal portion, said horizontal portions of said L-shaped base members facing each other and are, engaged by said sets of rollers when said wheels are being rotated through said predetermined angular interval relative to said base.

15. The container positioning mechanism of claim 12 wherein said means for maintaining said container platform in a horizontal plane comprises:
   a pair of parallel flat surfaces provided on the end of each of said pivot shafts received in said vertical slots;
   a chain gear provided on the end of said pivot shaft opposite said parallel flat surfaces;
   an axially disposed stationary gear; and
   a chain linkage connecting said stationary gear with each of said chain gears provided on the ends of each pivot shaft.

16. The container positioning mechanism of claim 11 wherein said platform of at least one of said three carriages has at least one horizontal container turn table.

17. The container positioning mechanism of claim 11 wherein said platform of at least one of said three carriages has a tilt top and means for tilting said tilt top with said linear displacement of said carriage as said wheels approach the end of said predetermined interval.

* * * * *